United States Patent [19]
Morris

[11] Patent Number: 5,242,177
[45] Date of Patent: Sep. 7, 1993

[54] LIFTING AND SUPPORTING ATTACHMENT FOR WHEELBARROWS

[76] Inventor: George H. Morris, Rte. 2, Box 190, Holt, Mo. 64048

[21] Appl. No.: 921,578

[22] Filed: Jul. 30, 1992

[51] Int. Cl.$^5$ ............................................. B62B 1/20
[52] U.S. Cl. ................... 280/47.31; 280/653
[58] Field of Search ............ 280/653, 47.29, 47.31, 280/652, 651, 47.3

[56] References Cited

U.S. PATENT DOCUMENTS

| | | | |
|---|---|---|---|
| 1,243,432 | 10/1917 | Lemke | 280/47.31 X |
| 1,575,863 | 3/1926 | Ottaviani | 280/47.3 |
| 2,465,112 | 3/1949 | Murphey | 280/47.3 |
| 2,544,505 | 3/1951 | Kronhaus | 280/47.31 |
| 2,715,786 | 8/1955 | Dorko | 280/47.3 X |
| 2,922,658 | 1/1960 | Manahan | 280/47.29 |
| 3,045,847 | 7/1962 | Fisher | 280/47.31 |
| 3,154,869 | 11/1964 | Pyrak | 280/47.18 X |
| 3,647,238 | 3/1972 | Mackey | 280/47.29 |
| 4,185,853 | 1/1980 | Thurmond, Jr. | 280/47.29 X |
| 4,758,010 | 7/1988 | Christie | 280/47.31 |

FOREIGN PATENT DOCUMENTS 1046104 12/1953 France .................. 280/47.31

Primary Examiner—Margaret A. Focarino
Assistant Examiner—Michael Mar
Attorney, Agent, or Firm—Litman, McMahon & Brown

[57] ABSTRACT

An attachment for a wheelbarrow includes a load support member pivotally secured to a frame of the wheelbarrow at a front end thereof and adapted to facilitate lifting and supporting of heavy or bulky items for transportation. The load support member is pivotally advanceable between a raised position and a lowered position such that, when the load support member is positioned in the lowered position, the load support member extends in front of the wheel of the wheelbarrow. The load support member is advanceable to the raised position when not in use.

9 Claims, 3 Drawing Sheets

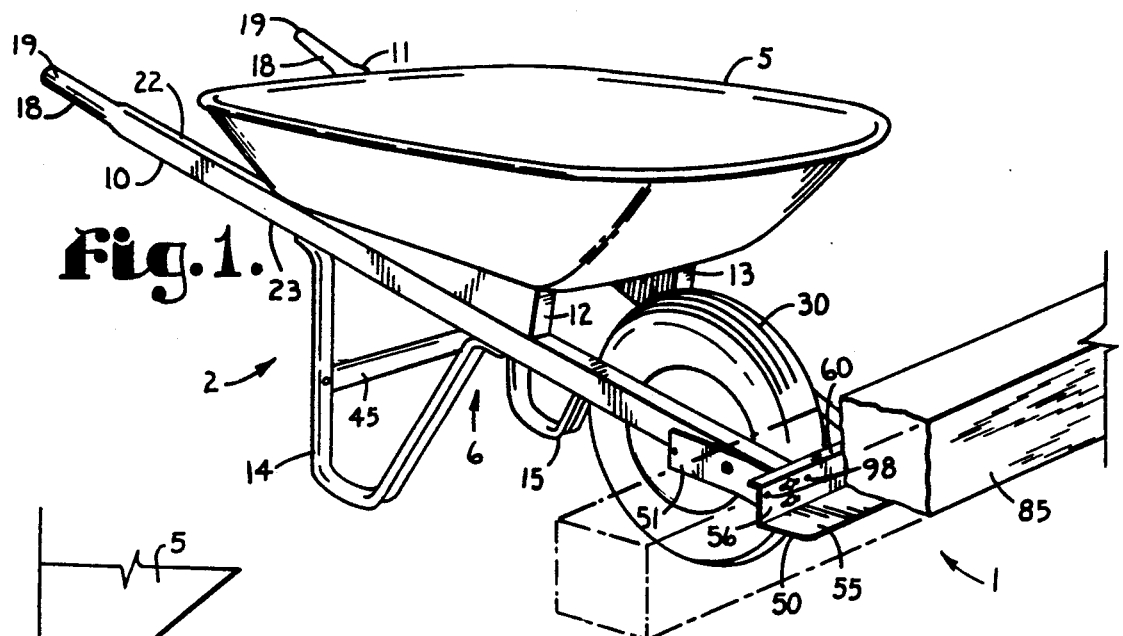
Fig. 1.
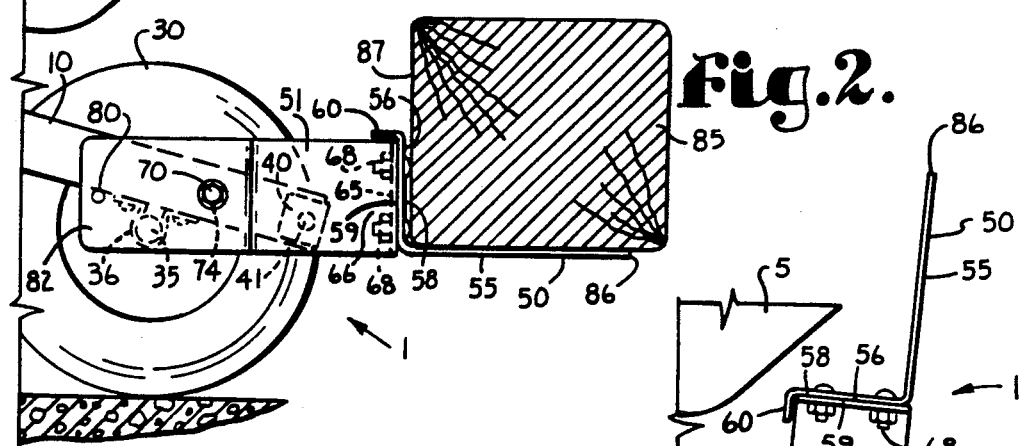
Fig. 2.
Fig. 3.
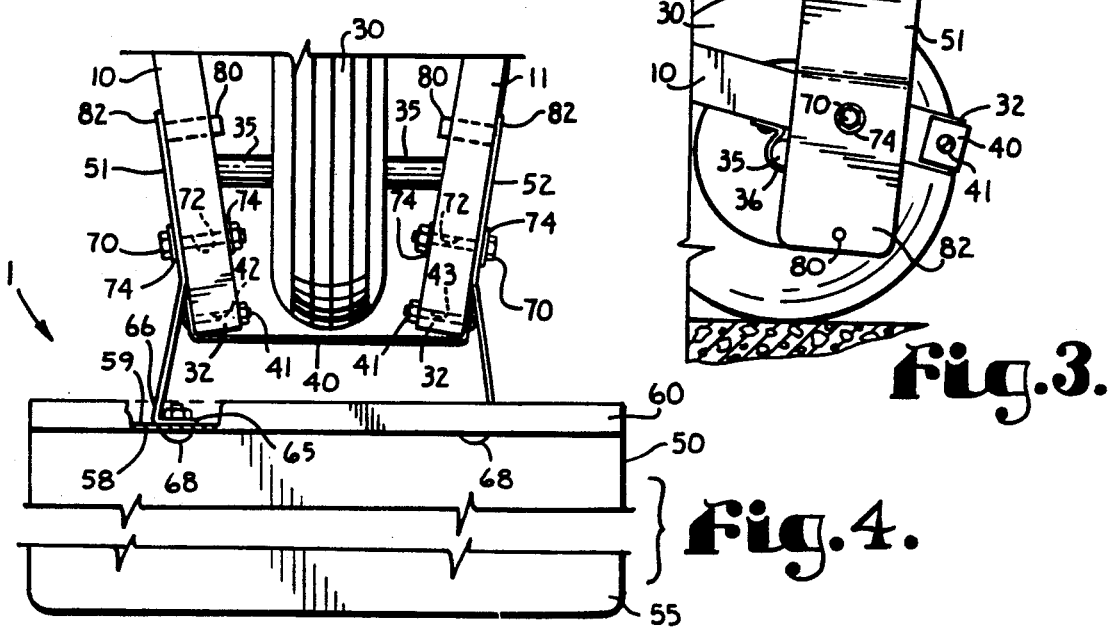
Fig. 4.

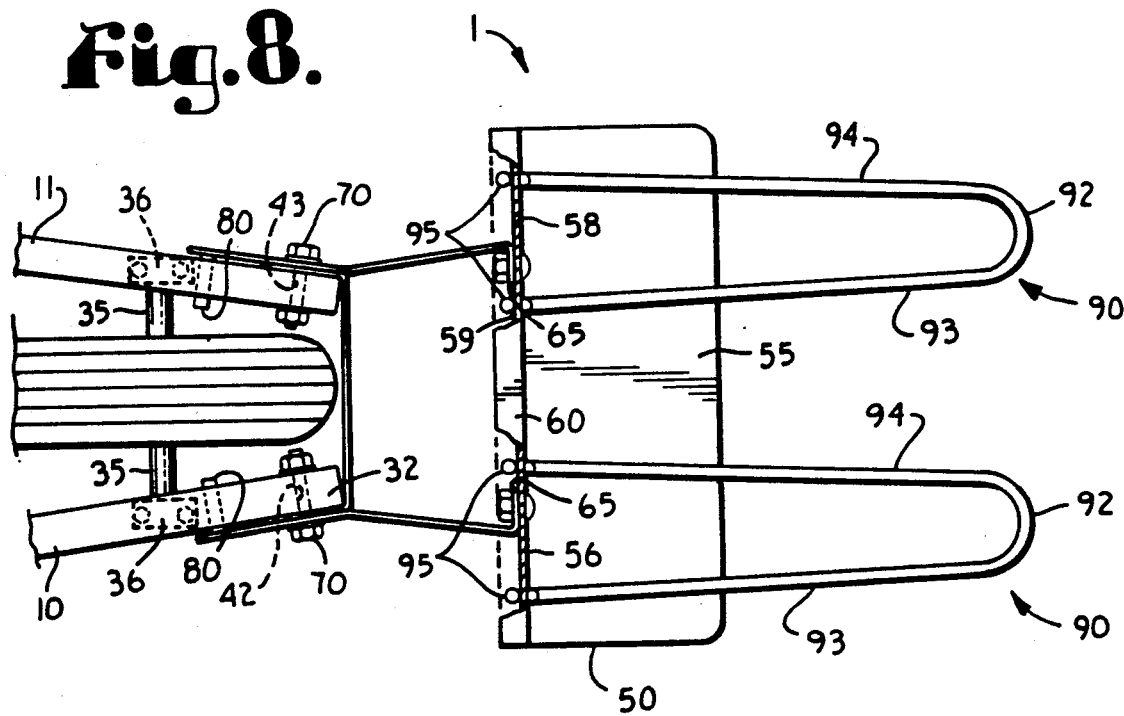

LIFTING AND SUPPORTING ATTACHMENT FOR WHEELBARROWS

BACKGROUND OF THE INVENTION

The present invention generally relates to an attachment for wheelbarrows to facilitate the lifting and supporting of heavy or bulky items.

The wheelbarrow is probably the most commonly used device for transporting or hauling materials around a yard or work site. However, the standard wheelbarrow is not well suited for transporting heavy and bulky items which do not readily fit in the tray of the wheelbarrow such as railroad ties or landscaping timbers which are frequently used in and around lawns and yards for landscaping purposes. Railroad ties are heavy and difficult to move and generally too long to fit in the tray of most wheelbarrows. The ties may be positioned across the sides of the tray. However, this arrangement makes the wheelbarrow extremely unstable and likely to tip. In addition, it is often difficult to simply lift heavy items such as railroad ties into the tray of a wheelbarrow for subsequent transport.

SUMMARY OF THE INVENTION

The present invention comprises an attachment for a wheelbarrow adapted to facilitate lifting and supporting of heavy or bulky items for transportation. The attachment comprises a pair of support brackets mounted on opposite sides of the frame of a wheelbarrow near a front end thereof. A load support member is secured to the support brackets such that the load support member extends in front of a front end of the wheelbarrow and forward of a wheel thereof. The support brackets are preferably pivotally secured to the frame of the wheelbarrow such that the lifting blade may be pivotally advanced between a lowered position and a raised position. In the lowered position the load support member is adapted for positioning beneath an item to be lifted to engage the item and for supporting such an item during transportation. The load support member may be raised to the raised position when not in use. The attachment preferably includes stop means for preventing the load support member from pivoting below the lowered position. The stop means may comprise a pin secured to each of the support brackets and positioned on the support brackets such that when the load support member is pivoted to the lowered positioned the stop pins engage the frame and prevent the blade from being pivoted therebeyond.

It is foreseeable that various accessories may be developed for use with the lifting attachment such as extension members for extending the length of the blade to facilitate use of the blade in lifting bulky yet relatively light items, such as bales of hay or the like.

OBJECTS AND ADVANTAGES OF THE INVENTION

Therefore, it is an object of the present invention to provide an attachment for wheelbarrows comprising a blade secured to the front end of a wheelbarrow by support brackets adapted to facilitate lifting of heavy and bulky items and to support such items during transport using the wheelbarrow; to provide such an attachment which may be pivotally advanced between a lowered position during use of the blade and a raised position when the blade is not used; to provide such an attachment which includes means for preventing the blade from advancing beyond a lowered position; to provide such an attachment which may be adapted for use in lifting and supporting various sizes and types of items; to provide such an attachment which is adaptable for use with commonly available wheelbarrows; to provide such an attachment which is relatively inexpensive to manufacture and is particularly well adapted for its intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of an attachment for wheelbarrows which embodies the present invention, shown secured to a wheelbarrow and supporting a railroad tie, with portions broken away to show detail thereof.

FIG. 2 is an enlarged and fragmentary side elevational view of the attachment as shown in FIG. 1.

FIG. 3 is a view similar to FIG. 2 with the attachment shown in a raised position with respect to the wheelbarrow to which it is attached.

FIG. 4 is a fragmentary top plan view of the attachment of the present invention shown secured to a wheelbarrow.

FIG. 8 is a fragmentary top plan view of the attachment shown secured to a wheelbarrow by pivot pins secured in wheel guard bore holes in the wheelbarrow.

DETAILED DESCRIPTION OF THE INVENTION

Figure 5:
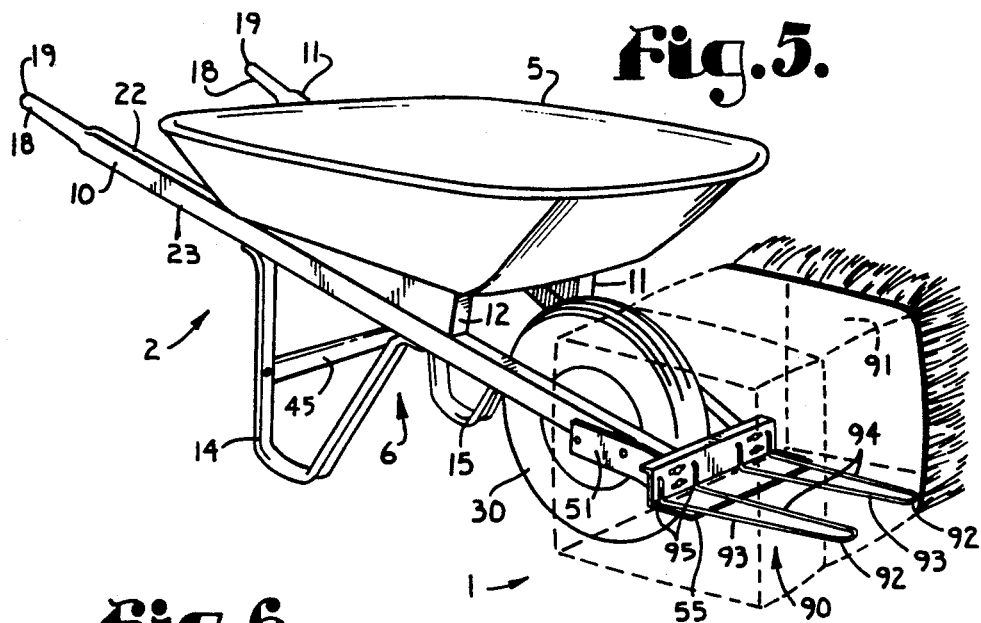
FIG. 5 is a perspective view of the attachment of the present invention shown secured to a wheelbarrow and having length extension members secured thereto and supporting a bale of hay.
Figure 6:
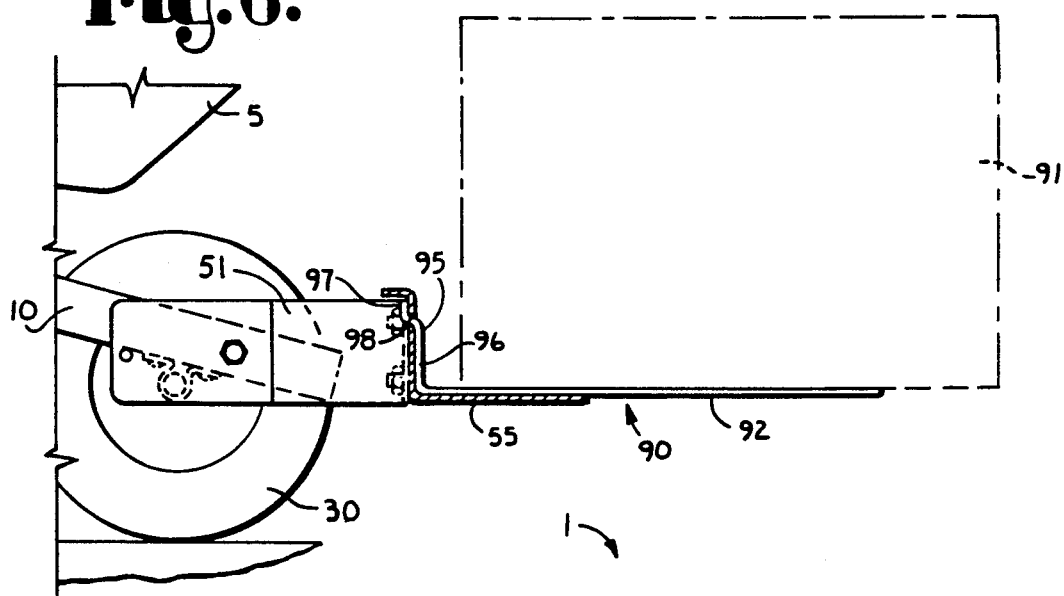
FIG. 6 is an enlarged and fragmentary side elevational view of the attachment secured to a wheelbarrow.
Figure 7:
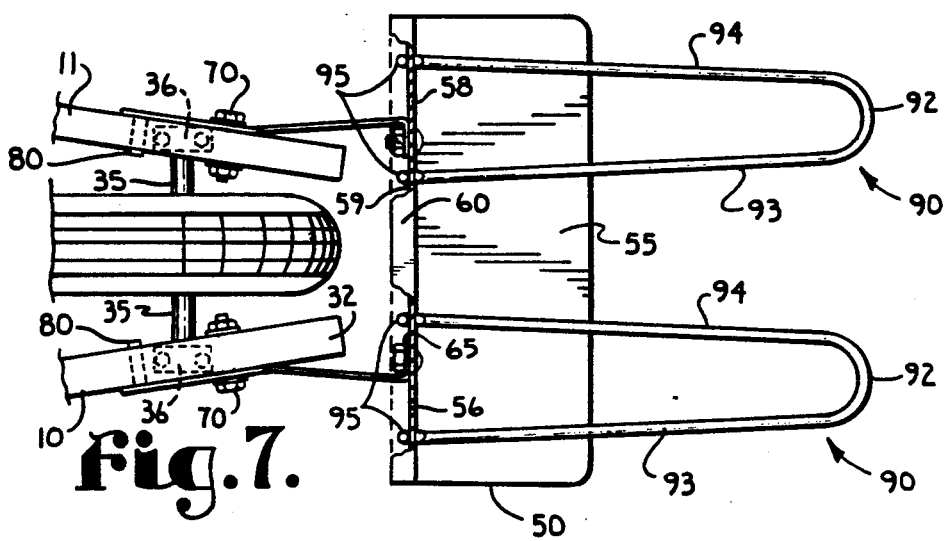
FIG. 7 is a fragmentary top plan view of the attachment with portions broken away to show detail thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 represents a lifting attachment for a wheelbarrow 2. The illustrated wheelbarrow 2 comprises a tray 5 supported on a frame 6. The frame 6 comprises first frame side member or handle 10, a second frame side member or handle 11, a first riser 12, a second riser 13, a first leg 14 and a second leg 15. The handles 10 and 11 generally comprise elongated wooden posts having a square or rectangular cross-section. Each handle 10 and 11 includes a rounded hand grip 18 at a rear end 19 thereof.

The first and second risers 12 and 13 are wedge shaped and are mounted on an upper surface 22 of the first and second handles 10 and 11 respectively, and the tray 5 is mounted on the risers 20 and 21. The first leg 14 and the second leg 15 are secured to a lower surface 23 of the first and second handles 10 and 11 respectively.

As best seen in FIG. 4, a wheel 30 is secured between the first and second handles 10 and 11 generally near a front end 32 of each handle 10 and 11. The wheel 30 is secured to an axle 35 which is rotatably secured to the handles 10 and 11 by axle brackets 36 (FIG. 3) mounted to the lower surface 23 of each handle 10 and 11. The wheel 30 generally extends in front of the tray 5. A front cross member or wheel guard 40 is secured to and extends between the front ends 32 of the first and second handles 10 and 11. The wheel guard 40 is secured to the handles 10 and 11 by bolts 4 extending through a first and a second wheel guard bore hole 42 and 43 formed near the front end 32 of each handle 10 and 11. A rear cross member 45 extends between rear portions of the legs 14 and 15, completing the frame 6.

The legs 14 and 15 cooperate with the wheel 30 to support the wheelbarrow 2 in an upright alignment when the wheelbarrow 2 is not in use such that the tray 5 is generally level. When the wheelbarrow 2 is to be used to transport items, the operator grasps the hand grips 18 of the handles 10 and 11 and raises the rear end 19 of the handles 10 and 11 slightly to pivot the handles 10 and 11 and the tray 5 about the axle 35 such that the legs 14 and 15 are raised off of the ground and the front end 32 of the handles 10 and 11 are lowered slightly. With the legs 14 and 15 raised slightly off of the ground, the wheelbarrow 2 may be advanced from location to location in a transport mode.

The lifting attachment 1 generally comprises a load support member or lifting blade 50, a first support bracket 51 and a second support bracket 52. The lifting blade 50 and the support brackets 51 and 52 are preferably made of carbon steel, such as 12 gauge A-569 carbon steel. The lifting blade 50 includes a blade portion 55 and a securement portion 56. The securement portion 56 includes a front surface 58 and a rear surface 59. The blade portion 55 extends perpendicular to and in front of the front surface 58 of the securement portion 56. The lifting blade 50 further includes a lip 60 extending perpendicular to and rearward from the rear surface 59. The lip 60 provides increased structural rigidity to the lifting blade 50.

Each support bracket 51 and 52 includes a flange 65 at a front end 66 thereof. The flange 65 of each support bracket 51 and 52 is secured to the securement portion 56 of the lifting blade 50 by means such as bolts 68 such that the rear surface 59 of the securement portion 56 engages the flanges 65. The first support bracket 51 and the second support bracket 52 are pivotally secured to the first handle 10 and the second handle 11 respectively by means such as bolts or pivot pins 70 secured in pivot pin receiving bores 72 in the handles 10 and 11. The pivot pin receiving bores 72, as shown in FIG. 4, generally must be drilled into the handles 10 and 11 of the wheelbarrow 2 near the front end 32 of the handles 10 and 11. The pivot pins 70 extend through apertures in the support brackets 51 and 52. The apertures are generally positioned medially on the support brackets 51 and 52. The brackets 51 and 52 may be oriented at angles to the securement portion 56 of the blade 50 or, as illustrated, may be of a wide v-shape to match the angle of the handles 10 and 11.

It is foreseeable that the bolts 41 securing the wheel guard 40 to the handles 10 and 11 could be removed from the wheel guard bore holes 42 and 43 and the pivot pins 70 could be inserted therein to pivotally secure the support brackets 51 and 52 to the handles 10 and 11 using the existing wheel guard bore holes 42 and 43 as shown in FIG. 8. It is also foreseeable that the support brackets 51 and 52 could be pivotally secured to the handles 10 and 11 respectively by the bolts 41 secured in the first and second wheel guard bore holes 42 and 43. Washers 74 may be secured to the pivot pins 70 to reduce resistance to pivoting of the support brackets 51 and 52.

The support brackets 51 and 52 are rotatable about the pivot pins 70 such that the lifting blade 50 may be rotatably advanced between a lowered position, as shown in FIGS. 1, 2 and 4, and a raised position, as shown in FIG. 3. When the wheelbarrow 2 is supported by the legs 14 and 15 in a resting position and the lifting blade 50 is positioned in the lowered position, the blade portion 55 of the lifting blade 50 is angled slightly upward from horizontal and away from the wheelbarrow 2. When the handles 10 and 11 are raised such that the wheelbarrow 2 is generally in the transport mode and the lifting blade 50 is positioned in the lowered position, the blade portion 55 generally extends horizontal to the ground in spaced relation thereto (FIG. 2). It is foreseen that the blade portion 55 of the lifting blade 50 may be angled slightly upward when the lifting blade is in the lowered position and the wheelbarrow 2 is in the transport mode such that an item supported thereon is less likely to fall or be knocked off.

The lifting blade 50 may be advanced to the raised position when not in use to increase the maneuverability of the wheelbarrow 2 and reduce the likelihood or personal injury or property damage caused by accidentally advancing the blade portion 55 into another person, a structure, a plant or similar items. The lifting blade 50 is preferably maintained in the raised position by engagement of the blade portion 55 of the lifting blade 50 on the tray 5 such that the first and second support brackets 51 and 52 are rotated slightly past a vertical alignment and slightly towards the rear of the wheelbarrow 2 and such that the engagement of the blade portion 55 on the tray 5 prevents the lifting blade 50 from rotating therebeyond. It is also foreseeable that rotation resistance means such as wing nuts, not shown, may be used with the bolts 70 to selectively tighten the bolts 70 against the first and second support brackets 51 and 52 to selectively secure the first and second support brackets 51 and 52 and the lifting blade 50 in a raised position.

The lifting attachment 1 further includes stop means such as stop pins 80 secured to the support brackets 51 and 52 to restrict the range of rotation of the support brackets 51 and 52 with respect to the handles 10 and 11 and to prevent the lifting blade from advancing beyond the lowered position. In particular, the stop pins 80 are preferably secured to the support brackets 51 and 52 at rear ends 82 thereof such that the stop pins 80 extend below lower surfaces 23 of the handles 10 and 11. When the lifting blade 50 is advanced to the lowered position, the stop pins 80 engage the lower surfaces 23 of the handles 10 and 11 and prevent the lifting blade 50 from rotating below the desired lowered position.

It is foreseen that the stop pins 80 may be positioned towards the front end 66 of the support brackets 51 and 52 between the apertures for the bolts 70 and the flanges 65 such that when the lifting blade 50 is advanced to the lowered position, the stop pins 80 engage the upper surfaces 22 of the handles 10 and 11 and prevent the lifting blade 50 from rotating beyond the lowered position. It is also foreseeable that two sets of stop pins 80 may be used both at the rear end 82 and near the front end 66 of the support brackets 51 and 52 for engaging both the upper surfaces 22 and the lower surfaces 23 of the handles 10 and 11 respectively when the lifting blade 50 is advanced to the lowered position.

The lifting attachment 1 is particularly well adapted for facilitating the lifting and transporting of railroad ties 85 and similar items as shown in FIG. 1. To use the lifting attachment 1 to facilitate lifting of a railroad tie 85, the wheelbarrow 2 is maneuvered such that a leading edge 86 of the blade portion 55 of the lifting blade 50 is positioned adjacent to the railroad tie 85 generally medially along its length. With the lifting blade 50 in the lowered position, the handles 10 and 11 are raised such that the leading edge 86 is lowered to the ground. The wheelbarrow 2 is advanced forward to advance the blade portion 55 of the lifting blade 50 beneath the railroad tie 85, preferably to the point where the back portion 56 of the lifting blade 50 engages a side 87 of the railroad tie 85. The handles 10 and 11 are then forced downward to raise the lifting blade 50 and the railroad tie 85 supported thereon off of the ground. The lifting attachment 1 may be used in a similar manner to lift other items not shown.

The lifting attachment 1 may also include extension means such as extension attachments 90, as shown in FIG. 5, for effectively extending the length of the blade portion 55 of the lifting blade 50 to allow the lifting attachment 1 to be used to support bulky but relatively lightweight items such as a bale of hay 91 or large boxes. The extension attachments 90 are preferably formed from a length of steel rod or thick wire which is generally bent in half to form a U-shaped extension portion 92 comprising a first leg 93 and a second leg 94. End portions 95 of the length of steel rod are bent to extend perpendicular to the extension portion 92 and generally form a fastening portion 96. Each end portion 95 is further bent to form a hook 97. Aligned apertures 98 in the back portion 56 of the lifting blade 50 are adapted to receive the hook 97 of each end portion 95 for securing the fastening portion 96 and therefore the extension member 90 to the lifting attachment 50. The extension attachments 90 are constructed such that when they are secured to the lifting attachment 1, a portion of the extension portion 92 rests on the blade portion 55 of the lifting blade 50 and the remainder of the extension portion 92 extends in front thereof. In use, an item such as a bale of hay 91 is positioned on the extension members 90 during transportation.

It is foreseen that various other attachments for the lifting attachment 1 may be developed for varying purposes and uses.

It is to be understood that while certain forms of the present invention have been illustrated and described herein, it is not to be limited to the specific forms or arrangement of parts described and shown.

What is claimed and desired to be secured by Letters Patent is as follows:

1. An attachment for a wheelbarrow having a tray secured to a frame including a first frame member, a second frame member and a wheel rotatably secured to said frame near a front end thereof; said attachment comprising:
   (a) a first support bracket pivotally securable to said first frame member;
   (b) a second support bracket pivotally securable to said second frame member;
   (c) a load support member secured to said first support bracket and said second support bracket so as to be pivotal between a raised position, with said first and second support brackets extending substantially vertically, and a lowered position, with said first and second support brackets extending substantially horizontally and with said load support member extending in front of said wheel of said wheelbarrow; and
   (d) a stop P in secured means a rearward end of at least one of said support brackets and extending perpendicular thereto for engaging at least one of said frame members when said load support member is advanced to said lowered position to prevent said load support member from pivotally advancing therebelow.

2. The attachment as disclosed in claim 1 wherein:
   (a) said load support member comprises a blade portion and a securement portion; said securement portion being secured to said first support bracket and said second support bracket and said blade portion being secured to said securement portion.

3. The attachment as disclosed in claim 2 and including:
   (a) extension means for effectively extending the length of said blade portion of said load support member.

4. The attachment as disclosed in claim 3 wherein said extension means includes:
   (a) an extension attachment having an extension portion and a fastening portion; said fastening portion removably securable to said load support member such that said extension portion extends beyond said blade portion of said load support member.

5. An attachment for a wheelbarrow having a tray secured to a frame including a first frame member and a second frame member; said wheel barrow further including a wheel rotatably secured to and between said first and second frame members near a front end thereof each of said first and second frame members including a wheel guard bore hole positioned near said front end thereof and adapted for use in securing a wheel guard to said first and second frame members such that said wheel guard extends across said front end of said first and second frame members; said attachment comprising:
   (a) a first support bracket pivotally securable to said first frame member by a pivot pin positionable within said wheel guard bore hole in said first frame member;
   (b) a second support bracket pivotally securable to said second frame member by a pivot pin positionable within said wheel guard bore hole in said second frame member;
   (c) a load support member secured to said first support bracket and said second support bracket so as to be pivotable between a raised position, with said first and second support brackets extending substantially vertically, and a lowered position, with said first and second support brackets extending substantially horizontally and with said load support member extending front of said wheel of said wheelbarrow; and (d) a stop pin secured near a rearward end of at least one of said support brackets and extending perpendicular thereto for engaging at least one of said frame members when said load support member is advanced to said lowered position to prevent said load support member from pivotally advancing therebelow.

6. The attachment as disclosed in claim 5 wherein:

(a) said load support member comprises a blade portion and a securement portion; said securement portion being secured to said first support bracket and said second support bracket and said blade portion being secured to said securement portion.

7. The attachment as disclosed in claim 6 and including:

(a) extension means for effectively extending the length of said blade portion of said load support member.

8. The attachment as disclosed in claim 7 wherein said extension means includes:

(a) an extension attachment having an extension portion and a fastening portion; said fastening portion removably securable to said load support member such that said extension portion extends beyond said blade portion of said load support member.

9. An attachment for a wheelbarrow having a tray secured to a frame including a first frame member and a second frame member; said wheelbarrow further including a wheel rotatably secured to and between said first and second frame near members a front end thereof and including a wheel guard securable to said first and second frame members by bolts extending through a wheel guard bore hole positioned near said front end of each of said first and second frame members such that said wheel guard extends across said front end of said first and second frame members; said attachment comprising:

(a) a first support bracket pivotally securable to said first frame member by a pivot pin positionable within said wheel guard bore hole in said first frame member;

(b) a second support bracket pivotally securable to said second frame member by a pivot pin positionable within said wheel guard bore hole in said second frame member;

(c) a load support member comprising a blade portion and a securement portion; said securement portion being secured to said first support bracket and said second support bracket to enable pivoting of said load support member between a raised position, with said first and second support brackets extending substantially vertically, and a lowered position, with said first and second support brackets extending substantially horizontally and with; said blade portion extending in front of said wheel of said wheelbarrow;

(d) a stop pin secured near a rearward end of at least one of said support brackets and and extending perpendicular thereto to engage at least one of said frame members when said load support member is advanced to said lowered position to prevent said load support member from pivotally advancing therebelow; and (e) an extension attachment having an extension portion and a fastening portion; said fastening portion removably securable to said load support member such that said extension portion extends beyond said blade portion of said load support member.

* * * * *